Jan. 26, 1954
C. B. DELANO
2,667,190
QUICK SET EXTENSION GAUGE
Filed Oct. 31, 1951
2 Sheets-Sheet 1
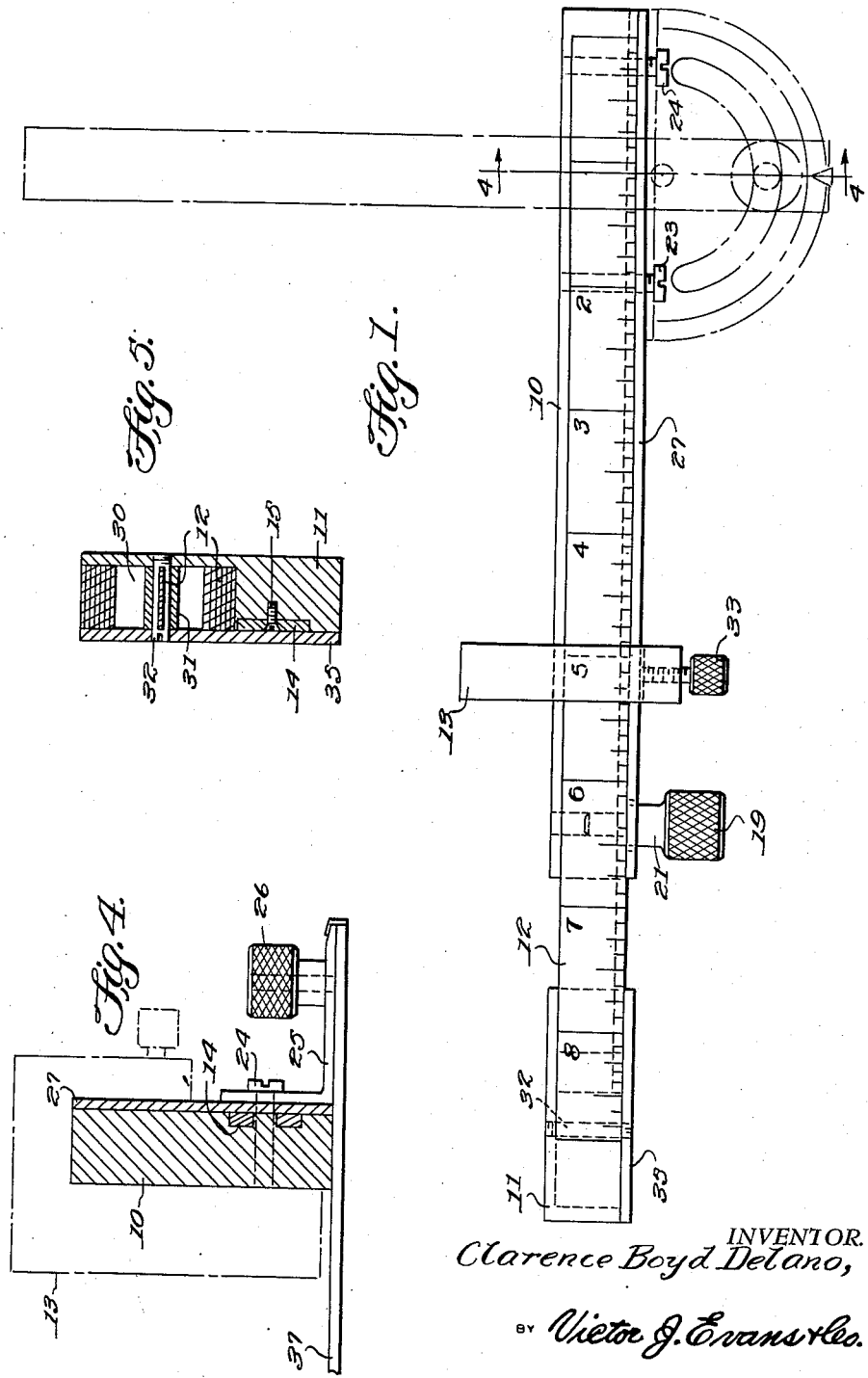
INVENTOR.
Clarence Boyd Delano,
BY Victor J. Evans & Co.
ATTORNEYS Jan. 26, 1954
C. B. DELANO
2,667,190
QUICK SET EXTENSION GAUGE
Filed Oct. 31, 1951
2 Sheets-Sheet 2
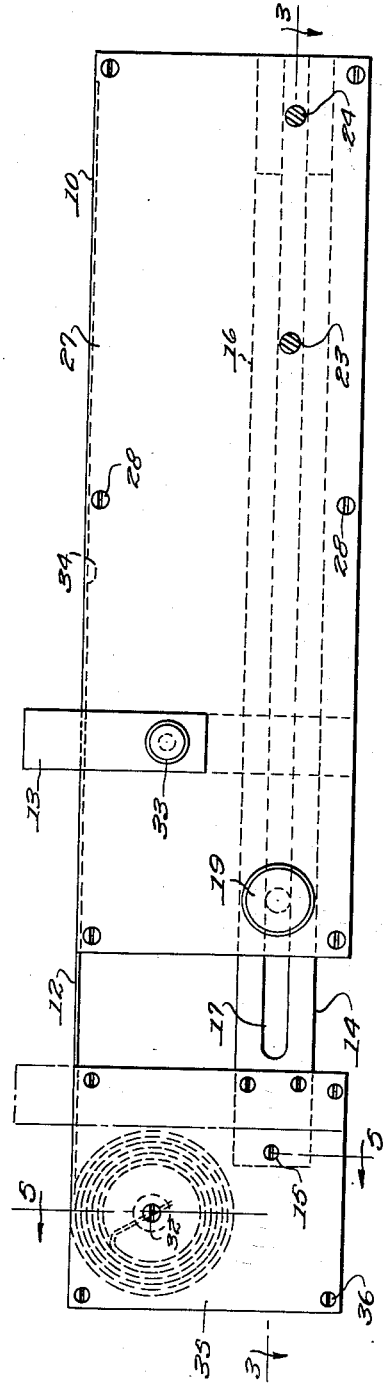
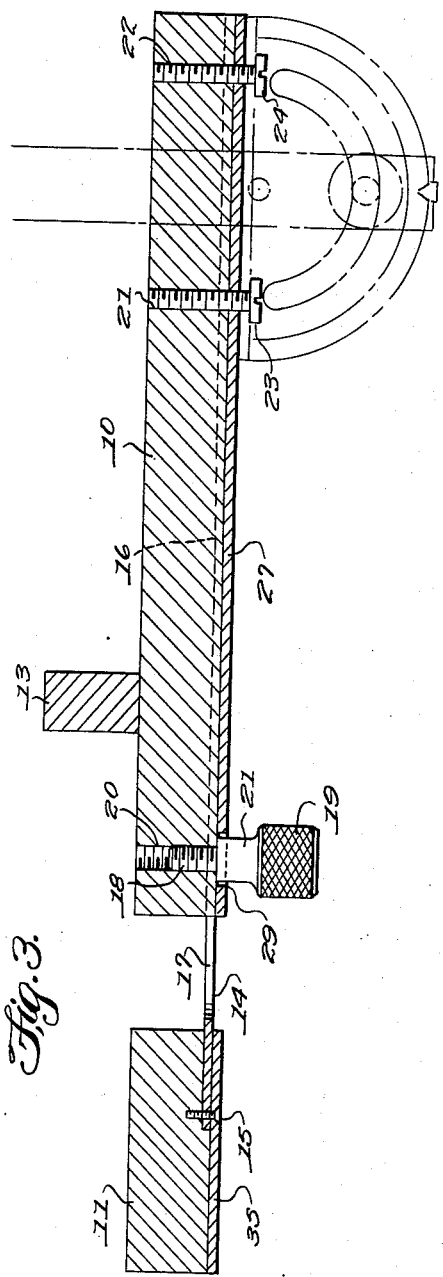
INVENTOR.
Clarence Boyd Delano,
BY Victor J. Evans & Co.
ATTORNEYS Patented Jan. 26, 1954

2,667,190

UNITED STATES PATENT OFFICE 2,667,190

QUICK SET EXTENSION GAUGE

Clarence Boyd Delano, Bristow, Okla., assignor of one-half to John L. Kohler, Bristow, Okla.

Application October 31, 1951, Serial No. 254,014

1 Claim. (Cl. 143—174)

This invention relates to measuring devices particularly used in combination with table saws and the like, and in particular an extensible gage having a block forming a base with a head slidably mounted thereon, a graduated tape mounted on a spool in the head and extended over one edge of the base, clamping elements securing the head in adjusted positions in relation to the base and also a clamp for providing a stop or guide to readily determine the width of a piece of material to be cut.

The purpose of this invention is to provide a quick set gage for cutting work on a table saw or the like whereby the gage is readily set by the tape mounted thereon to an adjusted position and is clamped in this position by a thumb screw threaded in the base and extended through a slot in an arm extended from the head.

Various types of measuring devices have been used in combination with table saws and the like and whereas blocks have been clamped to saw tables for providing stops, such devices are not efficient as it is difficult to hold a measuring rule or scale until the block is accurately clamped in position. With this thought in mind this invention contemplates a combination scale and clamping device whereby with the measuring instrument attached to the mitre gage of a saw table a stop may be accurately set to a desired distance from a saw by a scale on the gage and the gage may be extended to facilitate setting the block or stop an accurate distance from the saw.

The object of this invention is, therefore, to provide means for accurately positioning a stop on a table saw whereby a plurality of parts may be cut to a given dimension without changing stop of the device.

Another object of the invention is to provide an extensible gage for table saws that may readily be attached to a mitre gage positioned in a groove of the saw table.

A further object of the invention is to provide an extensible gage for table saws which is of a simple and economical construction.

With these and other objects and advantages in view the invention embodies an elongated block adapted to be attached to the mitre gage positioned in the slot of a saw table with a head slidably mounted on the block and positioned to extend therefrom, and a flexible rule or scale attached to the block and mounted on a spool in the head whereby a stop clamped to the block or head may readily be accurately positioned in relation to a saw.

Other features and advantages of the invention will appear from the following description taken in connection with the drawings, wherein:

Figure 1 is a plan view illustrating the improved quick set extension gage.

Figure 2 is an elevational view looking toward the rear side of the gauge showing the head partly extended.

Figure 3 is a sectional plan taken on line 3—3 of Figure 2 also showing the parts extended.

Figure 4 (sheet 1) is a cross section taken on line 4—4 of Figure 1 showing the gage block attached to a mitre gage and illustrating the stop in dot and dash lines thereon.

Figure 5 is a cross section taken on line 5—5 of Figure 2 showing a tape spool in the head of the gage.

Referring now to the drawings wherein like reference characters denote corresponding parts the improved extension gage of this invention includes a block or base 10, a head 11, a graduated tape 12, a stop 13 and a bar 14 which is attached to the head by screws 15 and which is slidably mounted in a slot 16 in the block 10.

The block 10, as illustrated in Figures 2 and 3, is of an elongated rectangular shape and is substantially rectangular shape in cross section. The grooves or slot 16 extends longitudinally through one side of the block and the head carrying bar 14 is slidably mounted in the groove. The bar 14 is provided with an elongated slot or channel 17 through which a thumb screw 18, having a knurled head 19, extends, the screw being threaded into an opening 20 in the block, as shown in Figure 3. The hub 21 of the thumb screw is positioned against the outer surface of the bar 14 whereby the bar is clamped to the block to hold the head 11 in adjusted positions.

The block 10 is also provided with threaded openings 21 and 22 which receive screws 23 and 24 that secure the block to a mitre gage 25 as shown in Figure 4 wherein the gage is provided with a thumb screw 26 that holds the gage and block in adjusted angular positions in relation to a saw.

The rear face of the block 10 is provided with a face plate 27 the plate 27 being secured to the block with screws 28. The hub 21 extends through an opening 29 in the plate 27.

The head 11 is formed with a cavity 30 in which a spool 31 is journaled on a pin 32 and the graduated tape 12 is positioned around the spool. The spring tension of the tape causes the tape to wind on the pin 32 as the head 11 moves toward the block 10.

The stop 13 is adjusted to the dimension desired on the tape 12 and the stop is secured in position by a thumb screw 33 which is threaded into the extended end of the stop 13 and positioned to bear against the face plate 27 on the surface of the block 10.

With the parts positioned in this manner the stop 13 has been adjusted on the block 10 to a dimension corresponding with the desired length of a piece of material, however if it is desired to use longer lengths the head 11 is adjusted outwardly whereby with the block 13 positioned thereon the long leg of the stop which extends downwardly as shown in Figure 4 provides means for engaging the end of a piece of material, such as a board, strip of material or block.

The head 11 is readily adjusted away from or toward the block 10 and the stop 13 may be used thereon as indicated by the dotted lines or the stop may not be used as may be desired.

With the gage attached to the conventional mitre gage of the saw the stop 13 may readily be set to desired distances from the saw to correspond with the length of the cut desired.

The steel or measuring tape 12, which is mounted on the pin 32 in the cavity 30 of the head 11 extends from the head and the end thereof is positioned in a groove 34 in the upper surface of the block 10. The end of the tape may be secured to the block by suitable means.

The head 11 may also be provided with a face plate 35 and the plate 35 is secured to the head by screws 36.

With the bar 14 attached to the mitre gage, as illustrated in Figure 4 a stick 37 of the gage is positioned in a slot in a saw table whereby the parts are readily adjusted in relation to a saw mounted to operate in the table.

It will be understood that modifications may be made in the design and arrangement of the parts without departing from the spirit of the invention.

What is claimed is:

In a quick set extension gage, a base of rectangular shape, a head spaced from said base and arranged in the same plane therewith, said head being provided with a cavity, a pin extending through said cavity, a spool journaled on said pin and positioned in said cavity, a spring actuated graduated tape mounted on said spool, there being a pair of spaced parallel slots in a surface of said base, a bar having one end secured to said head and said bar including a pair of spaced parallel legs slidably mounted in said slots, said legs defining a longitudinally extending channel therebetween, a thumb screw arranged in threaded engagement with said base and including a knurled outer head, said screw extending through said channel and including a hub abutting the outer surface of said bar, there being a plurality of threaded openings in said base for receiving securing elements for securing said base to a mitre gage, a face plate secured to the rear face of said base and provided with an opening for receiving the hub of said thumb screw, a stop member adjustably connected to said base, a face plate secured to said head, there being a groove in the upper surface of said base for receiving said tape.

CLARENCE BOYD DELANO.

References Cited in the file of this patent

UNITED STATES PATENTS

| Number | Name | Date |
| --- | --- | --- |
| 849,389 | Hayden | Apr. 9, 1907 |
| 1,140,330 | Merlin | May 18, 1915 |
| 1,168,853 | Chabre | Jan. 18, 1916 |
| 1,319,179 | Royle | Oct. 21, 1919 |
| 1,566,225 | Mills | Dec. 15, 1925 |
| 2,237,556 | Hedgpeth | Apr. 8, 1941 |
| 2,267,937 | Mattison | Dec. 30, 1941 |